United States Patent [19] [11] 4,189,815
Seelenbinder [45] Feb. 26, 1980

[54] DEVELOPER TRANSPORT ROLL

[75] Inventor: Terry G. Seelenbinder, Elk Grove Village, Ill.

[73] Assignee: AM International, Inc., Los Angeles, Calif.

[21] Appl. No.: 3,201

[22] Filed: Jan. 15, 1979

[51] Int. Cl.$^2$ .......................... B21B 27/02; B21B 31/08; B60B 15/00

[52] U.S. Cl. .......................................... 29/121.8; 29/132

[58] Field of Search ...................... 29/121.8, 129.5, 132

[56] References Cited

U.S. PATENT DOCUMENTS 1,743,623 1/1930 Ross ............................ 29/121.8 UX
2,084,960 6/1937 Johnson et al. ............. 29/121.8 UX
3,611,530 10/1971 Mayhew ........................... 29/132 X

FOREIGN PATENT DOCUMENTS 229514 8/1932 Italy ....................................... 29/121.8

*Primary Examiner*—Wayne L. Shedd
*Attorney, Agent, or Firm*—Anthony W. Karambelas; Russell L. Root

[57] ABSTRACT

A roll for friction feeding copy paper in the developer section of diazo copying machines is constructed by roughening its surface to a degree which provides an RMS value of 150 to 350 microinches, and then subjecting the thus roughened surface to a hard coat anodizing treatment.

5 Claims, 1 Drawing Figure

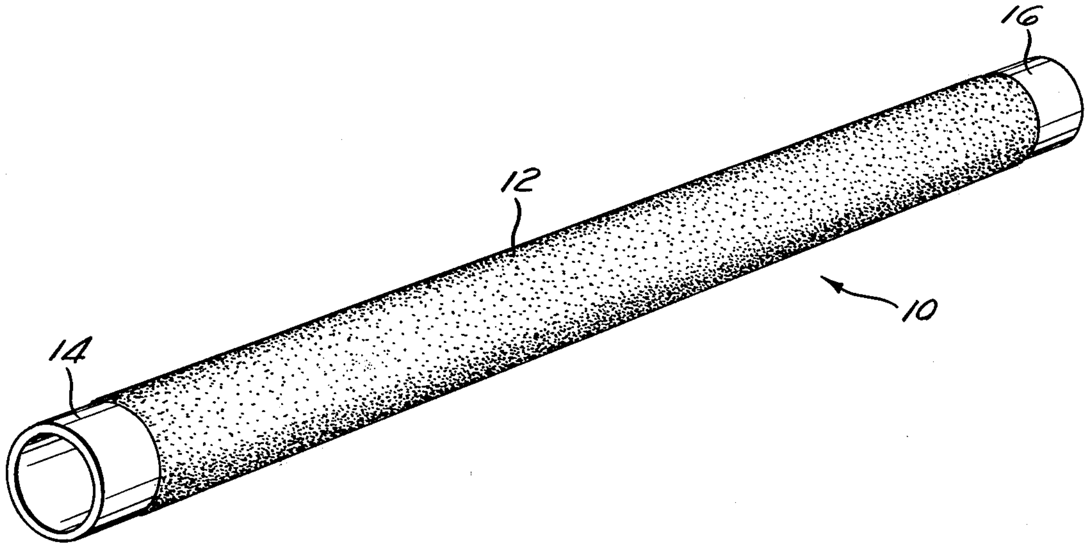
16
12
10
14

DEVELOPER TRANSPORT ROLL

BACKGROUND OF THE INVENTION

With reference to photocopying machines of the diazo type, it has been customary in one form of machine to develop the copy paper by feeding it past a mouth of a development chamber which applies a gaseous developing agent such as ammonia to the surface of the sheet. In this circumstance, the sheet must be fed reliably past the mouth of the chamber in fairly close contact with the mouth margins.

Various types of feeding systems have been developed for this purpose, but one type which has proven to be rather effective, while also being mechanically simple and relatively inexpensive to produce, involves the use of an elongate drum or transport roll which mates with the development chamber mouth and frictionally feeds the paper past the mouth at the appropriate development speed.

In devices of the kind just described, reliance for proper feeding action is placed entirely upon the frictional contact between the roll and the paper surface, and to assure this contact there is provided a sheet of antifriction material such as "Teflon" spanning the mouth of the development chamber and snugly embracing the adjacent portion of the roll. The copy paper is fed between the roll and the antifriction sheet which presses the copy sheet against the frictional surface of the roll. The antifriction sheet also has many perforations to permit access of the developing gas to the light sensitive surface of the paper.

The roll is conventionally formed from a long tube of metal such as aluminum. The term "aluminum" when used herein will be understood to include not only pure aluminum but also anodizable aluminum alloys in which the principle metal is aluminum. The frictional properties of the roll are enhanced by mechanical roughening procedures such as sand blasting, and treatment is provided to prevent wear of the roughened surface by contact with the paper. One customary treatment is to anodize the surface of the roll. So far as can be determined it has been customary to provide on the surface of the roll, a degree of roughness having an RMS value of about 100 microinches.

Apparatus of the above description is used with reasonable success, but has a certain operational drawback which it would be desirable to avoid if possible. This drawback is of such character that, if it were possible to eliminate its effect, acceptance of this type of equipment would be markedly improved.

Reference is had particularly to operator responsibility in connection with maintenance of the machine. For some reason the frictional properties of the roll are found to be rather variable depending upon the amount of use. This may be due to the fact that material from the antifriction sheet surface, or from the copy paper, gradually accumulates and tends to fill the depressions in the roughened roll surface so that the roll surface becomes smoother, in effect, and fails to feed the copy paper reliably. Whatever the cause, the prior art has determined that cleaning of the surface will substantially restore the frictional properties, and the customary instructions in the operator's manual provide for cleaning the roll surface once a week to avoid undue deterioration of its frictional properties.

SUMMARY OF THE INVENTION

The present invention involves the discovery that it is possible to construct a developer roll for a diazo copy machine by sand blasting and anodizing which has greatly improved properties as regards the duration of its frictional properties. The improvement is so marked in fact, that reference to cleaning of the roll does not need to appear in the operator's manual.

It has been discovered that there are certain particular specifications which must be met in the treatment of the roll surface in order to secure these important benefits. In particular the surface must be much rougher than heretofore believed, that is to say the roughness indentations must be both deeper and wider, such that the RMS value lies in the range between 150 and 350 microinches. In addition, it has also been discovered that conventional anodizing treatment does not prove satisfactory, and that a different type referred to as "hard coat anodizing" is required. When these restrictions are adhered to, the friction properties of the roll are found to have an unexpectedly drastically extended life to an extent that the operator need not be concerned with cleaning of the roll. It can be allowed to remain merely as an item on the check list for calls by a service man. During a call the service man can easily run a test for the feeding capability of the roll. If there should be found impairment beyond a predetermined level, the service man will perform the cleaning operation. If not, the degradation in frictional properties, if it occurs at all, takes place so slowly that the machine can be counted on to operate reliably at least until another service period expires and probably much longer.

At this point it has not been determined why this unexpected freedom from requirements for cleaning is related to larger RMS values of surface roughness, but it has been adequately proved by tests that this beneficial property is present only when the increased degree of roughness is present.

DESCRIPTION OF THE PREFERRED EMBODIMENT

The single FIGURE of the drawing is a perspective view of a roll made in accordance with the present invention.

In carrying out the present invention the developer drum is formed of a metal tube, preferably aluminum. Short portions at each end of the drum are coated with a tough, inert masking composition for a reason which will presently appear.

The tube is then subjected to a sand blasting process, preferably using a grit of appropriate size to bring about the degree of roughness desired.

It is noted, however, that any grit which will produce a desired surface roughness condition whose RMS value is in the range of 150 to 350 microinches will be suitable. Experience has shown that roughness with an RMS value in the range of 160 to 200 microinches is particularly satisfactory, and for this range a grit size of 80 is usually considered optimum. The significance of the term "grit" and the manner of defining grit of various sizes is well known in the metal working arts, and details with respect to this aspect may be found in the *Metals Handbook,* Eighth Edition, published by the American Society for Metals in 1964, Vol. 2, page 364.

With respect to the familiar use of RMS values as a measurement of surface texture or roughness, a detailed explanation appears in *Machinery's Handbook,* 20th Edition, published in 1975 by the Industrial Press, Inc., page 2393.

When the proper degree of roughness has been achieved, the tube is placed in an anodizing bath for the time and at the temperature and current levels necessary to produce on the friction surface a layer of hard coat anodizing, between about 0.0015 and 0.0025 inches in thickness.

Hard coat anodizing is a well known term of art, and the procedure is described in relative detail in the second volume of the *Metals Handbook*, cited above, page 622, under the heading "Hard anodizing."

When the hard coat anodizing process is complete, the masking material is cleaned from the surface of the tube, providing an effective long life developer feed roll 10 for diazo copiers as shown in the drawing. This roll has an elongate central feeding section 12 which provides for friction driving of the copy paper over long periods of use without cleaning. Accelerated tests, currently in effect, have demonstrated a use duration equivalent to about four years of actual use without giving any sign that the need for roll cleaning is imminent.

The short sections at either end of the roll, designated 14 and 16, are relatively smooth portions which remain after the masking material is removed. The tube material as it comes from the supplier will normally have a surface smooth enough to be suitable, but if not, the marginal surfaces 14, 16 at the ends may be polished to provide a surface roughness reading of about RMS 30 to 40 microinches. These areas are intended to run in contact with resilient sealing cuffs at the ends of the developer tank to avoid escape of ammonia gas into the room atmosphere and therefore should be smooth enough to avoid undue wear of the cuffs with use.

One fact that was discovered in connection with the studies leading to this invention was that a roll provided with somewhat higher roughness characteristics would, inexplicably, demonstrate a property which allowed it to work effectively without routine cleaning. Another fact that was discovered was that such a roll, even though conventionally anodized, was subject to a shorter overall wear life than prior art rolls. It appeared as though the more prominent roughness peaks which characterize the structure of the invention were more easily burnished off in use. Whatever the explanation, it was ultimately decided to try the application of a hard coat anodizing treatment in place of the conventional anodizing to see what effect this would have, if any. The result of these combined treatments was remarkably fortuitous, for the hard coat anodizing treatment was found to multiply the wear life of the roll by a factor of about five. This not only placed the roll of the present invention on a par with the prior art rolls, but in fact gave it a wear life substantially in excess of such rolls, and did so without any significant impairment of the property which exempts the roll of this invention from the requirement for routine cleaning.

From the foregoing description it can be seen that the present invention represents an important advance in the use of developer rolls for diazo copiers which move the copy paper directly by friction. The rolls of this invention exhibit important properties of greatly extended use between cleanings due to the unexpectedly effective technique of merely altering the surface roughness in the direction of substantially larger RMS values than previously used, and then treating the roughened surface by the hard coat anodizing process.

What is claimed is:

1. A developer feed roll for diazo photocopying machines comprising a roll having a surface of aluminum in which the RMS value of the roughness of the major portion of its surface is between 150 and 350 microinches and in which the thus roughened surface has been subjected to a hard coat anodizing treatment to provide an anodized layer of at least 0.0015 inches in thickness.

2. A developer feed roll as set forth in claim 1 in which the RMS value of the roughness of the surface is between 160 and 200 microinches.

3. A developer feed roll as set forth in claim 1 in which there are two smooth unanodized areas on the roll, one at either end of the roughened portion of the roll surface, arranged for cooperation with sealing cuffs associated with a cooperating developer chamber.

4. The process of making a developer feed roll for diazo photocopy machines comprising the steps of:

sandblasting an aluminum tube to create a roughened surface whose roughness has an RMS value between 150 and 350 microinches; and thereafter applying to the roughened surface of the tube a hard coat anodizing treatment.

5. A process as set forth in claim 4 which further comprises applying a tough, relatively inert masking material to spaced portions of the tube before carrying out the sand blasting and hard coat anodizing treatments, and removing the masking material after the treatments have been completed.

* * * * *